July 22, 1969 J. JOYCE 3,457,402
CIRCUITRY FOR CHECKING RAIL CONTINUITY
Filed Oct. 6, 1967
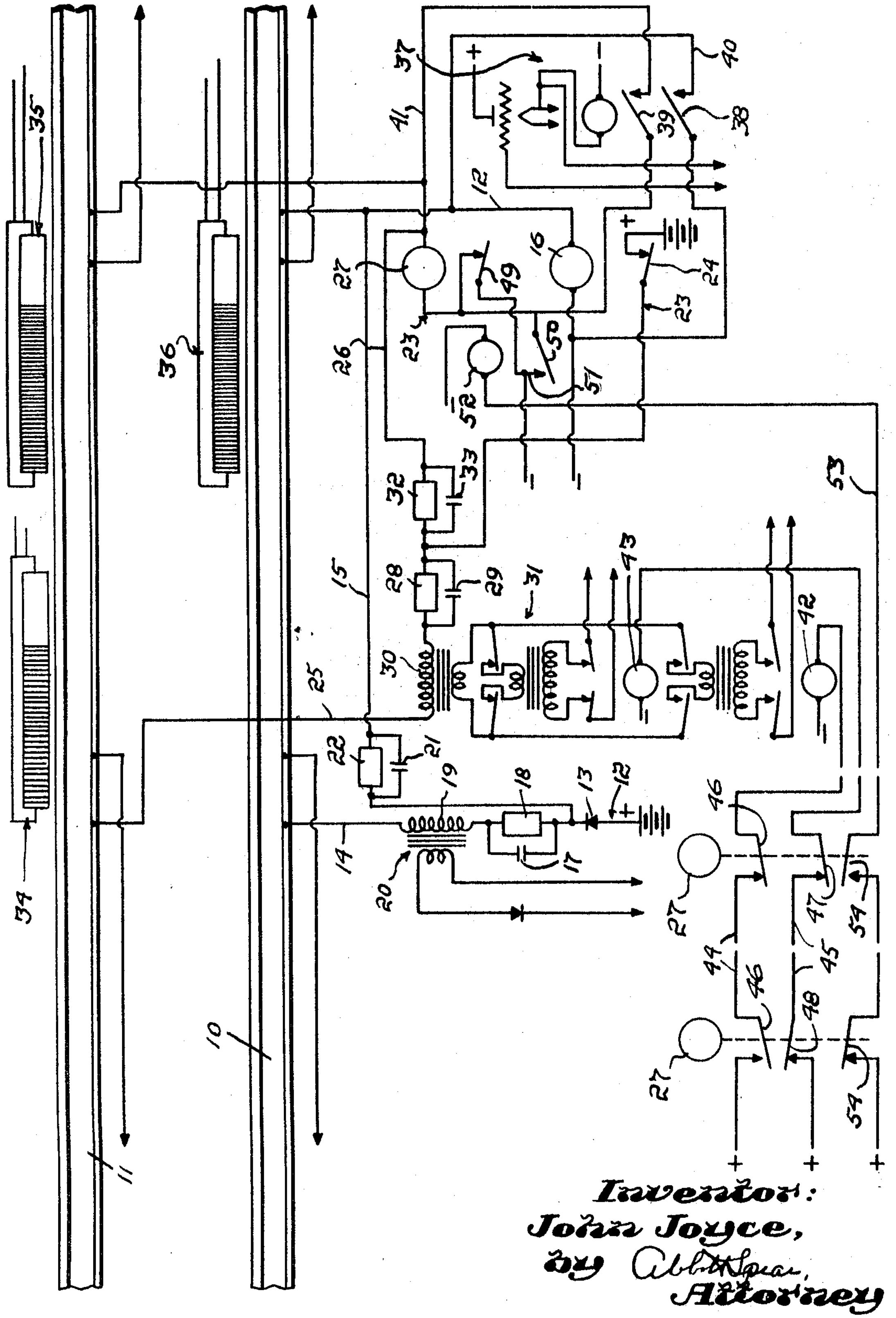
Inventor:
John Joyce,
by Albert Spear,
Attorney 3,457,402

CIRCUITRY FOR CHECKING RAIL CONTINUITY

John Joyce, 179 Thacher St., Milton, Mass. 02187

Filed Oct. 6, 1967, Ser. No. 673,503
Int. Cl. B61l 23/04
U.S. Cl. 246—121 10 Claims

ABSTRACT OF THE DISCLOSURE

Circuitry for checking the continuity of rails, each circuit including first and second parallel leads and a relay, one lead of each circuit including a length of rail, the current at the source, the relay value and the resistance of the leads being such as to require the completion of a circuit through both of its leads for desired relay operation, preferably with portions of the rail included in the leads of adjacent sections overlapping, together with circuitry controlling shunting and vehicle speeds.

The present invention relates to circuitry for checking the continuity of rails.

While the invention is adapted for use in various systems it is herein discussed with particular reference to two rail track systems. Such systems have been the subject of many attempts to ensure safe operation but such have not been wholly satisfactory as is evidenced by the number of accidents each year that occur in spite of the use of safety equipment.

One cause of accidents is rail breaks and while circuits are used that check lengths of rails for continuity these have been incapable, by way of example, of detecting breaks in angle bar areas and in insulation joint areas.

The general objective of the invention is to provide circuitry that is effective to check rail continuity throughout any desired length. In accordance with the invention, this objective is attained by providing battery circuits, one for a predetermined part of such a rail length, a block, for example, each circuit including a pair of parallel leads and a relay, the current at the source, the relay value, and the resistance of the leads being such that the desired operation of the relay is not possible unless the circuit is completed through both of the parallel leads, one parallel lead including said predetermined rail part. For best operation, the part of a rail length included in one circuit has an overlap with each adjacent rail length part.

Another objective of the invention is to provide that the relay of each circuit is a fail-safe control of other circuitry.

Another objective of the invention is to provide a series of such circuits for each rail of a two rail system with the relays effecting shunting and speed control.

In the single figure of the accompanying drawing, an illustrative embodiment of the invention is schematically shown to illustrate these and other of its objectives, novel features, and advantages.

In the embodiment of the invention illustrated by the drawing, the track consists of the continuous rails 10 and 11 divided into blocks or sections. As each track section has the same wayside equipment, only that at one of the sections is fully shown in order to simplify the drawings.

In order to achieve the principal objective of the invention of continuously determining, at each section, the continuity of the rails, a first battery circuit 12 includes a diode 13 and parallel leads 14 and 15 and the relay 16. The lead 14 includes a condenser 17, a resistor 18, the coil 19 of the generally indicated transformer 20 and the rail 10 in one section or block. The lead 15 includes a condenser 21 and a resistor 22. The transformer 20 is sometimes hereinafter referred to as the shunting transformer, the rail 10 as the shunting rail, and the relay 16 as the shunting rail relay.

The relay value, the voltage, and the resistances of the parallel leads 14 and 15 are such that the relays 16 are energized only if their parallel leads are both closed. Thus, if a rail breaks or if any other part of either lead is broken, the relay 16 in circuit therewith will drop out.

A second battery circuit 23 includes the switch 24 of the shunting rail relay 16 which is closed when the relay 16 is energized, the parallel leads 25 and 26 and the relay 27. The lead 25 includes a resistor 28, a condenser 29, the coil 30 of the generally indicated transformer 31 and the rail 11 in a section or block. The lead 26 includes a resistor 32 and a condenser 33. The transformer 31 will sometimes be referred to as the speed control transformer, the rail 11 as the speed rail, and the relay 27 as the speed control relay.

As in the case of the circuits 12, the voltage, lead resistance, and relay values of its parallel leads of the circuit 23 are so balanced that the relay 27 is energized only if both of the leads 25 and 26 are closed so that it will drop out if the rail 11 breaks or either of the leads 25 or 26 opens for any reason.

It will be noted that the length of the rails in the leads 14 and 25 of one section have short overlaps with the corresponding leads of adjacent sections thus eliminating danger areas that existed in previous systems such as rail portions in angle bar areas which were shunted out by bonding wires and rail portions in insulated joint areas. The overlaps also provide an effective shunt between adjacent sections. If a break occurs in an overlap portion of a rail, it causes the batteries of the affected sections to be connected inseries opposition, shunting out the appropriate relays 16 and 27.

While the relays 16 and 27 may serve simply to provide a signal of a break in a rail or that the circuitry had been tampered with, they may affect other circuits such as those including crossing signals and its is preferred that they affect traffic in a manner such as taught by United States Patents No. 3,227,870 and No. 3,293,581.

As is more fully detailed in said patents, a vehicle has a plurality of coils each tuned to a different frequency and operable, in response to the presence of that frequency in a rail, to establish a predetermined maximum speed at which the vehice may be operated. Preferably, the vehicle may be operated on a low speed, emergency basis, if no such current is available. Two such coils are indicated at 34 and 35, the coil 34 providing a medium speed limit and the coil 35 a high speed limit.

As is also described in said patents, the vehicle is also provided with a shunting coil 36 operable, when the vehicle is being operated, to shunt out the circuit to the generally indicated shunting relay 37 for the section next to the rear of that in which the vehicle is then traveling. The shunting relay 37 for each section is powered by the shunting transformer 20 of the next preceding station.

Each shunting relay 37 has switches 38 and 39 that are open when that shunting relay is energized. The switch 38 is in a lead 40 connected to a circuit 12 to shunt out of service the shunting relay 16 when the shunting relay 37 is deenergized. The switch 39 is in a lead 41 connected to the circuit 23 to shunt out the speed control relay 27 when the shunting relay 37 is deenergized.

It will be apparent, accordingly, that as a vehicle enters a block or section it will shunt out the associated relay 37 and the switches 38 and 39 of the then shunted relay will then close the shunting leads 40 and 41. As a consequence, the relays 16 and 27 will both be deenergized with the circuit 23 of that section then being opened.

The transformer 31 of each block or section includes relays 42 and 43 in wayside battery circuits 44 and 45, respectively. When the relay 42 is energized, a frequency is delivered to the rail 11 to effect the operation of the vehicle with a predetermined high speed limit and when the relay 43 is energized, the frequency delivered to the rail 11 results in a lower speed limit on the operation of the vehicle. Both circuits 44 and 45 are controlled by the relay 27 at each of the two next preceding sections. The circuit 44 has a switch 46 at each of said two preceding sections and each is closed when the appropriate relay 27 is energized. Thus, high speed operation is not possible unless both of the two next preceding relays 27 are energized.

The circuit 45 for each section has a switch 47 and a section 48, the switch 47 being for the first of the two next preceding sections and closed when its relay 27 for that section is energized and the switch 48 being for the second of said next two preceding sections and closed when its relay 27 is deenergized. Thus, the low speed circuit 45 is closed only when a train is in said second preceding section.

When a shunting relay 37 shunts out the relays 16 and 27 of a section, movement of a vehicle in that section is impossible except at whatever emergency low speed is permitted when neither of its pick-up coils is energized.

Each relay 27 includes a switch 49 common to the circuit 23 and to the shunting lead 41 and closed except when the relay 27 is shunted out of service. A switch 50, in a parallel lead 51, is closed whenever the relay 52 is energized.

The relay 52 of each section is in a checking circuit 53 also controlled by the relays 27 of the next two preceding sections, the checking circuit 53 having a switch 54 at each of said two sections, each switch 54 being closed when its relay 27 is deenergized. It will be seen, accordingly, that when a vehicle has passed through said two sections, the associated checking circuit closes and the switch 50 is closed to effect the re-energization of the relay 27 of that section. It will be noted that the circuit 12 is closed once a vehicle has cleared a section so that its relay 16 is energized to then close the switch 24.

From the foregoing, it will be apparent that the invention not only provides a continuous check of the rails 10 and 11 throughout their length but also provides for traffic control on a fail-safe basis.

A break in the rail 10, for example, results in the deenergization of a relay 16 and the consequent opening of the associated circuit 23. As the relay 27 of that block or section is then deenergized, the transformer 31 cannot provide either speed-operating frequency. If the rail 11 should break, for example, the circuit 23 opens with the same result.

Although the illustrated embodiment utilizes D.C. track circuits for use on steam or diesel railroads, the invention may be adapted for use on all electric railroads by using A.C. current for the track circuits in which case the secondary of the shunting transformer 19 would be made resonant to a frequency different from that of the track circuits by the addition of a condenser.

I claim:

1. Circuitry for checking the continuity of a length of a rail through a series of sections, said circuitry comprising circuits for the rail, one circuit for each section and including a current source, first and second parallel leads, and a relay, each first lead including the length of the rail of a section, the current at the source, the relay value, and the resistance of the leads being so related as to require that both leads be complete to effect the desired operation of the relay of that circuit, and a traffic control circuit operated by said relay.

2. The circuitry of claim 1 in which the first leads overlap with respect to the rail in adjacent sections.

3. The circuitry of claim 1 in which each first lead includes one coil of a transformer, a shunting circuit includes the other coil of the transformer, and a shunting relay in a following section, operative to shunt out the continuity checking circuit of that following section.

4. The circuitry of claim 1 in which each first lead includes one coil of a transformer, and a speed control circuit for each section includes the other coil of said transformer.

5. Circuitry for checking the continuity of a length of a pir of rails through a series of sections, said circuitry comprising circuits for each rail, one circuit for each section, each circuit including a current source, first and second parallel leads, and a relay, each first lead including the length of the appropriate rail of that section, the current at the source, the relay values, and the resistances of the leads of each circuit being so related as to require that both leads be complete to effect the desired operation of the relay of that circuit, and a traffic control circuit operated by said relay.

6. The circuitry of claim 5 in which the first leads of each section overlap with respect to the rails in adjacent sections.

7. The circuitry of claim 5 in which one continuity checking circuit is also a shunting circuit and includes a relay in control of the other continuity checking circuit, said other continuity checking circuit is also a speed control circuit.

8. The circuitry of claim 7 in which each first lead of a shunting circuit includes one coil of a transformer, a shunting circuit includes the other transformer coil and a shunting relay in a following section operative to shunt out the shunting and speed control circuits of the following section.

9. The circuitry of claim 8 in which each first lead of a speed control circuit includes one coil of a transformer, a plurality of control circuits include the other coil of each transformer and operable to provide for the delivery of different frequencies to the speed control circuits, and operating circuits including switches in at least two preceding sections including relays to open and close said control circuits, the switches of the operating circuits at each section being operated by the relay of the speed control circuit.

10. The circuitry of claim 9 and a checking circuit for each section operable to place the relay of each speed control circuit back in service, each checking circuit including a switch in each of the two preceding sections, each held in its open position when the speed control relay for that section is energized.

References Cited

UNITED STATES PATENTS 1,066,538 7/1913 Smith.

EVON C. BLUNK, Primary Examiner

G. LIBMAN, Assistant Examiner

U.S. Cl. X.R.

324—64